(12) United States Patent
Kim

(10) Patent No.: US 6,256,680 B1
(45) Date of Patent: Jul. 3, 2001

(54) PROCESS FOR CONTROLLING COMMUNICATIONS BETWEEN A COMPUTER SYSTEM AND AN EXTERNAL DEVICE

(75) Inventor: In-Ho Kim, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/012,224

(22) Filed: Jan. 23, 1998

(30) Foreign Application Priority Data

May 2, 1997 (KR) .................................................. 97-17058

(51) Int. Cl.[7] ....................................................... G06F 9/54
(52) U.S. Cl. ................................................................ 709/328
(58) Field of Search .................................... 709/310–332, 709/227; 379/165, 93.28, 265, 356; 345/330; 455/413, 433

(56) References Cited

U.S. PATENT DOCUMENTS

| | | | |
|---|---|---|---|
| 4,431,870 | | 2/1984 | May et al. ............................. 379/357 |
| 4,659,876 | | 4/1987 | Sullivan et al. .................... 379/93.19 |
| 4,860,342 | * | 8/1989 | Danner ............................... 379/93.28 |
| 5,309,509 | * | 5/1994 | Cocklin et al. ....................... 379/165 |
| 5,572,675 | | 11/1996 | Bergler ................................. 709/328 |
| 5,574,888 | | 11/1996 | Panditji et al. ........................ 703/26 |
| 5,627,978 | * | 5/1997 | Altom et al. .......................... 345/330 |
| 5,802,304 | * | 9/1998 | Stone .................................... 709/227 |
| 5,917,905 | * | 6/1999 | Whipple et al. ...................... 379/356 |
| 5,946,386 | * | 8/1999 | Rogers et al. ........................ 379/265 |
| 5,978,672 | * | 11/1999 | Hartmaier et al. ................... 455/413 |
| 6,181,935 | * | 1/2001 | Hartmaier et al. ................... 455/433 |

OTHER PUBLICATIONS

Mirho et al., "Reach Out and Touch Someone's PC: The Windows Telephony API," Microsoft Systems Journal, pp. 15–25, 28–36, 38, 40, 42, 44, Dec. 1993.*

* cited by examiner

Primary Examiner—St. John Courtenay, III
(74) Attorney, Agent, or Firm—Robert E. Bushnell, Esq.

(57) ABSTRACT

A process, for controlling computer communications using a control window in a Windows™ type of operating system. The process makes programming easier, provides a convenient interface, uses TAPI commands and makes the available functions more intuitively obvious to a user.

22 Claims, 7 Drawing Sheets

PROCESS FOR CONTROLLING COMMUNICATIONS BETWEEN A COMPUTER SYSTEM AND AN EXTERNAL DEVICE

This application makes reference to, incorporates the same herein, and claims all rights accruing thereto under 35 U.S.C. §119 through my patent application entitled Controlling Process for Computer Communications Using Control Window earlier filed in the Korean Industrial Property Office on the 2nd day of May 1997 and there duly assigned Ser. No. 1997/17058.

BACKGROUND OF THE INVENTION

1. Field of the Invention

The present invention relates to computer communications with external devices and, more specifically, to an apparatus and a process for controlling the communications between a computer system and an external device.

2. Background Art

Data communication schemes primarily utilize modems in combination with communication software applications in order to transfer information between two sources, typically two computer systems. The general computer system has a central processing unit, a random operating memory, a random access memory, a hard disk drive, an input device, and an output display device. The random operating memory is used to store sets of instructions, such as the basic input ouput system (BIOS). A computer system uses the random access memory as its main memory and the hard disk drive as an auxiliary memory device. Lastly, a computer system generally includes a modem to enable communication with external devices or other computer systems. Computer systems have been interfaced with a wide variety of external devices, such as a second computer system, telephones, facsimile, etc. This is shown, by way of example in: U.S. Pat. No. 4,431,870 to May entitled Telephone System with Computer Generated Dial Pad and Automatic Dialing, U.S. Pat. No. 5,574,888 to Panditji entitled A Process and Apparatus for Establishing Compatibility Between Communication Applications Producing AT Commands and a Telephony Application Programming Interface, U.S. Pat. No. 4,860,342 to Danner entitled Computer-Telephone Interface Process and Apparatus, U.S. Pat. No. 4,659,876 to Sullivan entitled Audiographics Communication System, and U.S. Pat. No. 5,572,675 to Bergler entitled Application Program Interface.

I have observed that when a user enters a command into a computer system to establish a connection with an external device, the CPU causes the modem to open a communications line. Then, the CPU instructs the modem to generate the necessary dialing signals and further instructs the modem to verify that the connection has been established. The central processing unit continuously checks until a connection with the desired external device is detected and then causes the modem to execute the commands entered into the computer system by a user. After the commands have been carried out the central processing unit determines whether a terminate connection command has been given and continues to process entered commands until the terminate connection command is entered into the computer system. Once the terminate connection command is detected the modem is instructed to disconnect the line to the external device. However, I have further observed that the above process for controlling computer communications in a Microsoft® Windows™ type of operating system requires complicated programming by a user and that the available functions are not always intuitively obvious to a user. A Microsoft® Windows™ type of operating system is a graphical interface that translates simple icons and menus into disk operating system commands to simplify the operation of computers. I expect that a process for controlling the communications between a computer system and external devices using a control window in a Windows™ type operating system would allow for a convenient user interface, that simplifies the entry of commands for a user, and allows for many of the available functions to be more intuitively obvious to a user.

SUMMARY OF THE INVENTION

Accordingly, it is an object of the present invention to provide a process for controlling computer communications using a Windows™ type operating system that simplifies the entry of commands for the user.

It is another object to provide a process for controlling computer communications using a control window that has a convenient user interface.

It is still another object to provide a process for controlling computer communication that functions that are intuitively obvious to a user.

These and other objects are achieved by using a process for controlling computer communications using a control window that entails the steps of: opening a usable line using a telephony application programming interface (TAPI) line open command provided by a Windows™ type operating system. TAPI is a high level programming interface for Windows™ which supports may types of telephony operations associated with conventional analog public phone lines, digital medium such as digital public branch exchange (PBE) phone lines, integrated services digital network (ISDN) phone lines and eventually wireless medium. When a user is operating a communications application that is running on a computer system to communicate with an external device, a specific AT command is generated by the communications application. The AT command is then received by an interface, such as a modem card, a fax card, digital signal processor cards, etc., between the computer system and an input/output device. The interface then passes the command to a communication task, a combination of software and hardware that processes information and sends it from one device to another. The communications task then performs the specific operation. This communication scheme is bi-directional, thus allowing status codes commonly used in the art to be sent from the conventional communication task through the communication port and into the communication application, resulting in a subsequent operation being performed or a message being displayed by the application. TAPI is explained in further detail in U.S. Pat. No. 5,574,888 to Panditji entitled A Process and Apparatus for Establishing Compatibility Between Communication Applications Producing AT Commands and A Telephony Application Programming Interface which is herein wholly incorporated by reference.

Registering a control window in a TAPI line callback function, generating dialing signals corresponding to the data input by a user, using a TAPI line dial command to receive various messages in the control window during communications with a modem, performing a function that corresponds to the received messages or commands, and closing the in-use line using a TAPI line close command when the user inputs a terminate connection command.

It is preferable that the step of registering a control window is performed after the step of generating dialing signals using a line dial command. It is also preferable that the step of receiving and processing messages entails the steps of: checking whether a message was generated in the line callback function; continuing to check the line callback function when a message is not generated and proceeding to the next step when it is determined that message has been generated in the line callback function; transmitting the received message to the control window; checking whether the message was displayed in the control window and continuously checking the control window until it is determined that the message has been received; and performing the function that corresponds to the message received by the central processing unit when it is determined that the message has been displayed in the control window.

The use of this invention process can be demonstrated by the controlling of telephone functions for either binary computer data or voice transmission. This entails the steps of: displaying a control window screen that contains a handset graphic and a call button on a monitor; displaying a control window that contains telephone number keys and a hang-up button on the monitor when the user selects the handset graphic or the call button; making a phone call by dialing the desired number on the telephone number keys; and disconnecting the phone call by pressing the hang-up button.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
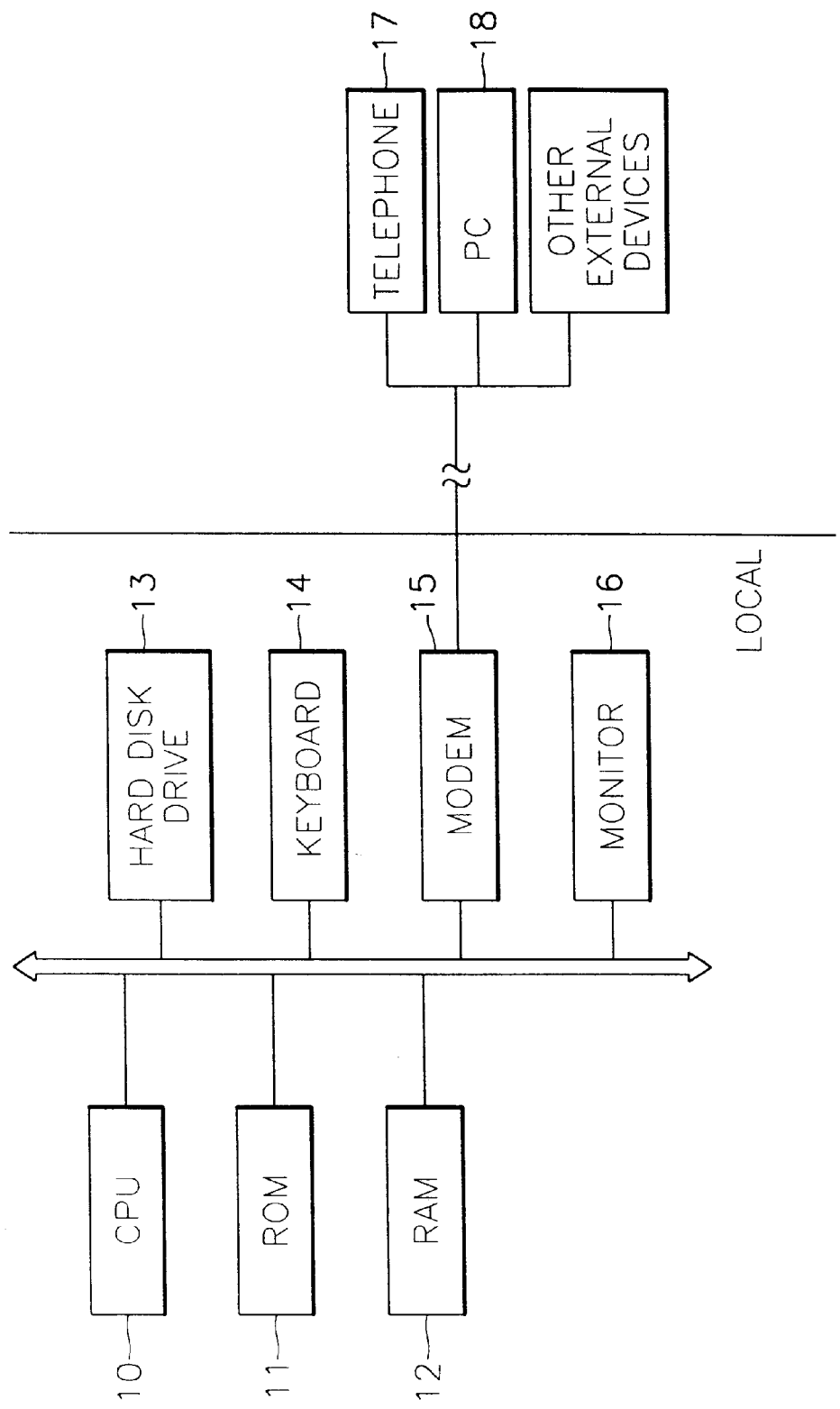
FIG. 1 is a block diagram of a computer system.

Turning now to the drawings, FIG. 1 illustrates a computer system that includes central processing unit (CPU) 10, random operating memory (ROM) 11 that stores basic instruction sets such as BIOS, random access memory (RAM) 12, hard disk drive 13 functioning as an auxiliary memory device, keyboard 14 functioning as an input device, and monitor 16 functioning as an output display device. Additionally, modem 15 may be used to communicate with external devices, such as telephone 17 or personal computer 18. To communicate with an external device via the computer system, a user inputs a command through keyboard 14 and central processing unit 10 performs the appropriate communication controlling process required to execute the command entered by the user.

Figure 5:
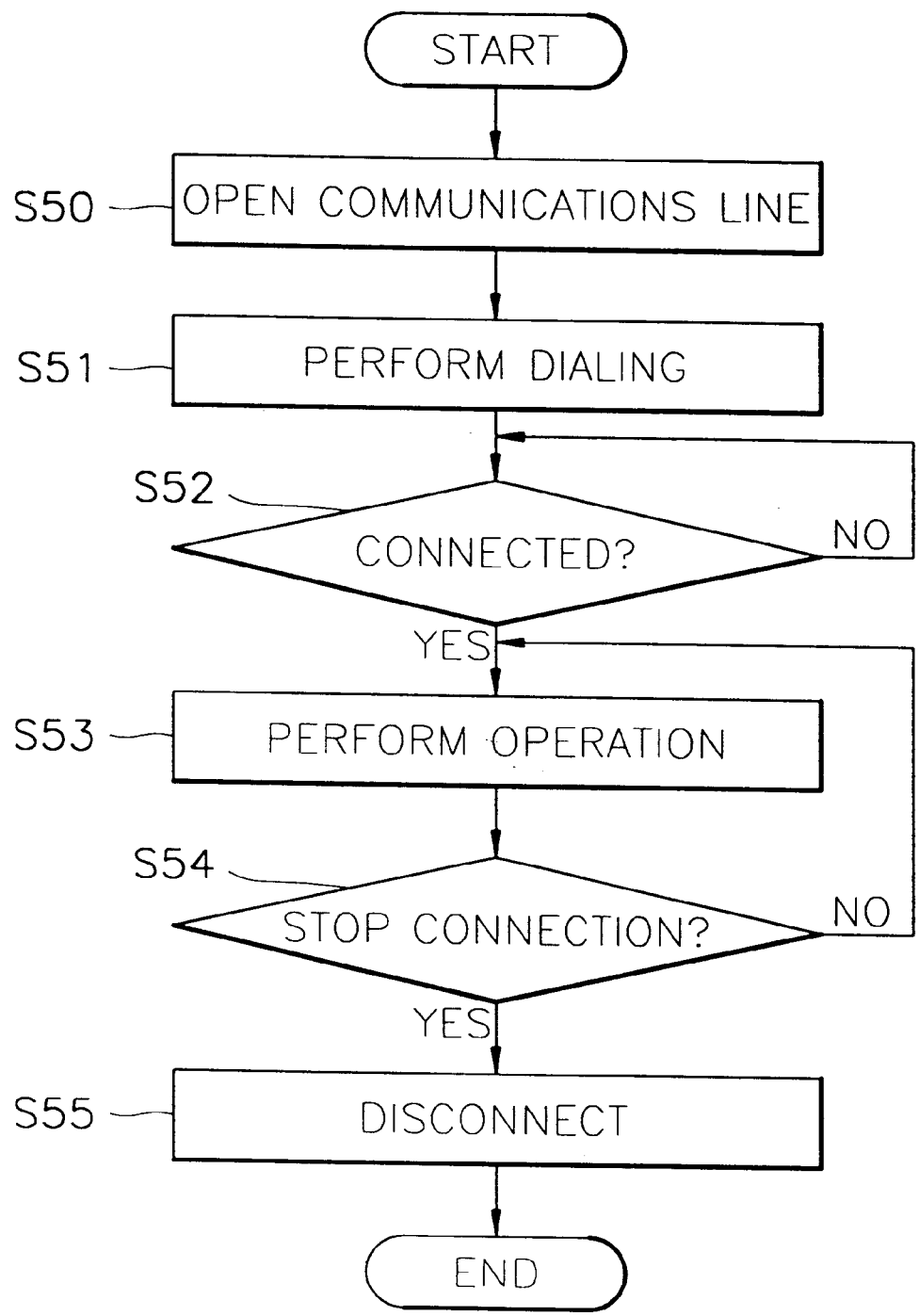
FIG. 5 is a flowchart of a process for controlling computer communications.

FIG. 5 shows a flowchart of a process for controlling computer communications. First, during step S50, a user inputs a start communications command. This causes the CPU to instruct the modem to open a communications line. In step S51, the CPU causes the modem to generate the dialing signals corresponding to the commands entered by the user. Then, during step S52, the CPU makes a check to determine whether the computer system is connected to the desired external device. If the CPU cannot verify that the desired connection has been established, the CPU will continue to check on a regular basis to determine when the connection is successful. During step S53, after the CPU has determined that the computer system is connected to the desired external device, the operations corresponding to commands sent from the user are performed. Then, in step S54, the CPU checks to determine whether the user has input a terminate connection command. If a terminate connection command is not detected, the computer system returns to step S53 and the operations corresponding to any commands sent by the user are performed. During step S55, after it is determined that the user has entered a terminate connection command, the line to an external device is disconnected.

Figure 6:
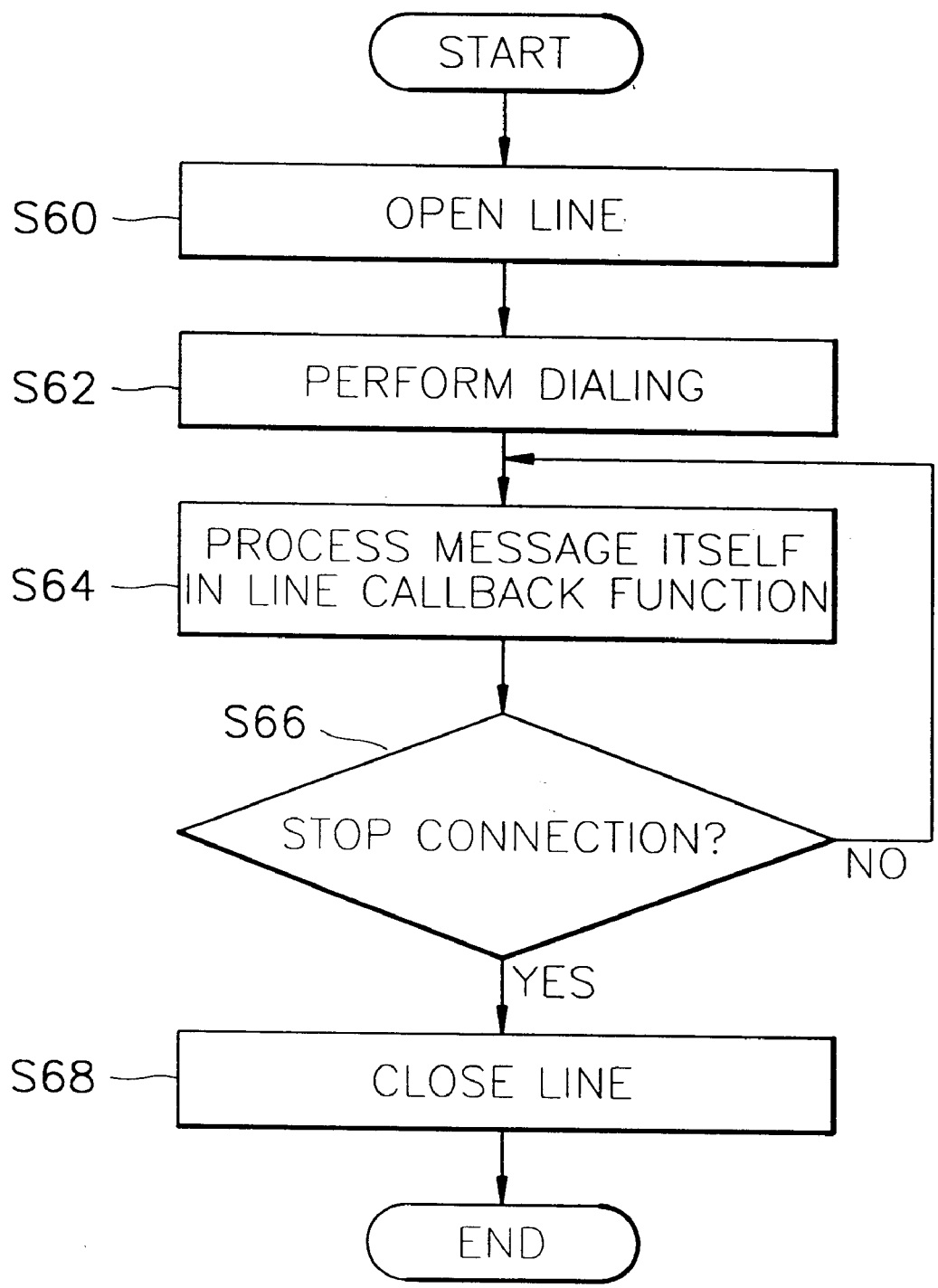
FIG. 6 is a flowchart of a process for controlling computer communications using TAPI of Windows™.

FIG. 6 shows the same process used in a Windows™ type of operating system. To perform the above process using a Windows™ type of operating system it is helpful to use the telephony application programming interface (TAPI) provided in Windows™. First, a line open command is used to open a usable communications line. The action of a usable line being opened by a modem is performed during step S60. Then, in step S62, a TAPI line dial command causes the modem to generate the dialing signals necessary to execute the instructions entered by a user. During step S64 a control message is sent to the application that is running on the computer system. This message was generated by the communication task depending on the state of the modem. The line callback can perform such functions as transferring a dial tone, stopping a communications connection, connecting to an external device, etc., by controlling the apparatuses relevant to a modem. In step S66, a check is made by the CPU to determine whether a user has entered a terminate connection command. When no terminate connection command is detected the CPU returns to step S64. Alternatively, if a terminate connection command is detected, the CPU sends a TAPI line close command. Then, in step S68 all open lines are closed and the communications are terminated.

Figure 7:
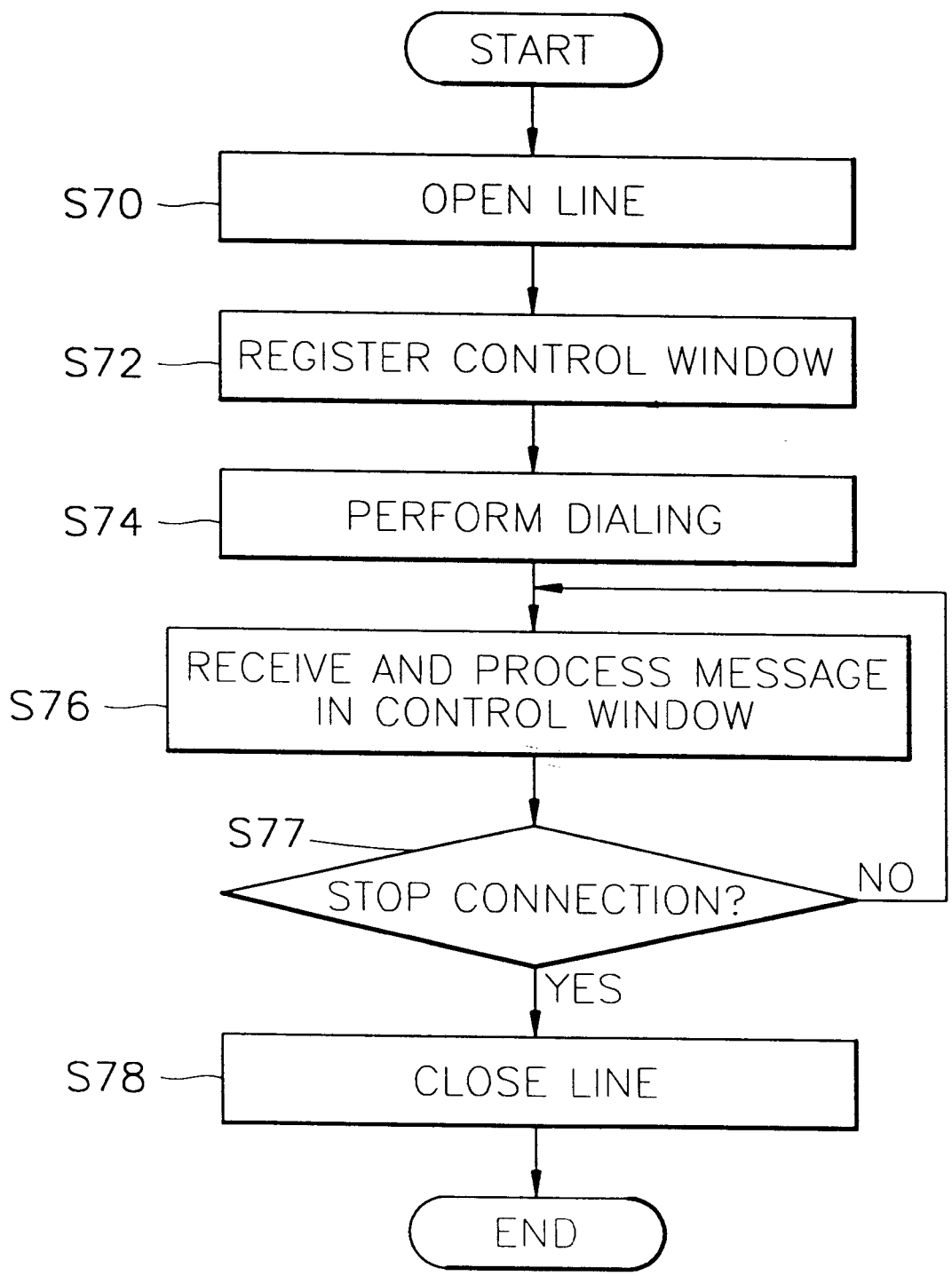
FIG. 7 is a flowchart of a process for controlling computer communications using a control window according to the present invention.

FIG. 7 illustrates a process for controlling communication between a computer system and an external device using a control window in a Windows™ type operating system. In step S70, a TAPI line open command causes a modem to open a communication line. Then, during step S72, a window for controlling the communications between the computer system and the external device is displayed and the window is registered in a line callback function of TAPI. In step S74, the necessary dialing signals are sent to execute the commands entered by a user. The dialing signals are sent in accordance with a TAPI line dial command to allow the user to connect to the desired external device. Various messages and current information, generated during communications with the modem in the line callback function, are transmitted to the control window. These messages are received and processed during step S76. In step S77, a check is made to determine whether the user has entered a terminate connection command. If a terminate connection command is not detected then the CPU returns to step S76. Alternatively, when a termination stop command is detected, the line is closed during step S78 using a TAPI line close command. As an alternative embodiment, step S72, the registering of a control window, can be performed after step S74, the performing of the dialing. As described above, in the process according to the present invention, a special control window is registered in the line callback function, and the control window receives all of the generated messages and performs functions corresponding to the received messages.

Figure 8:
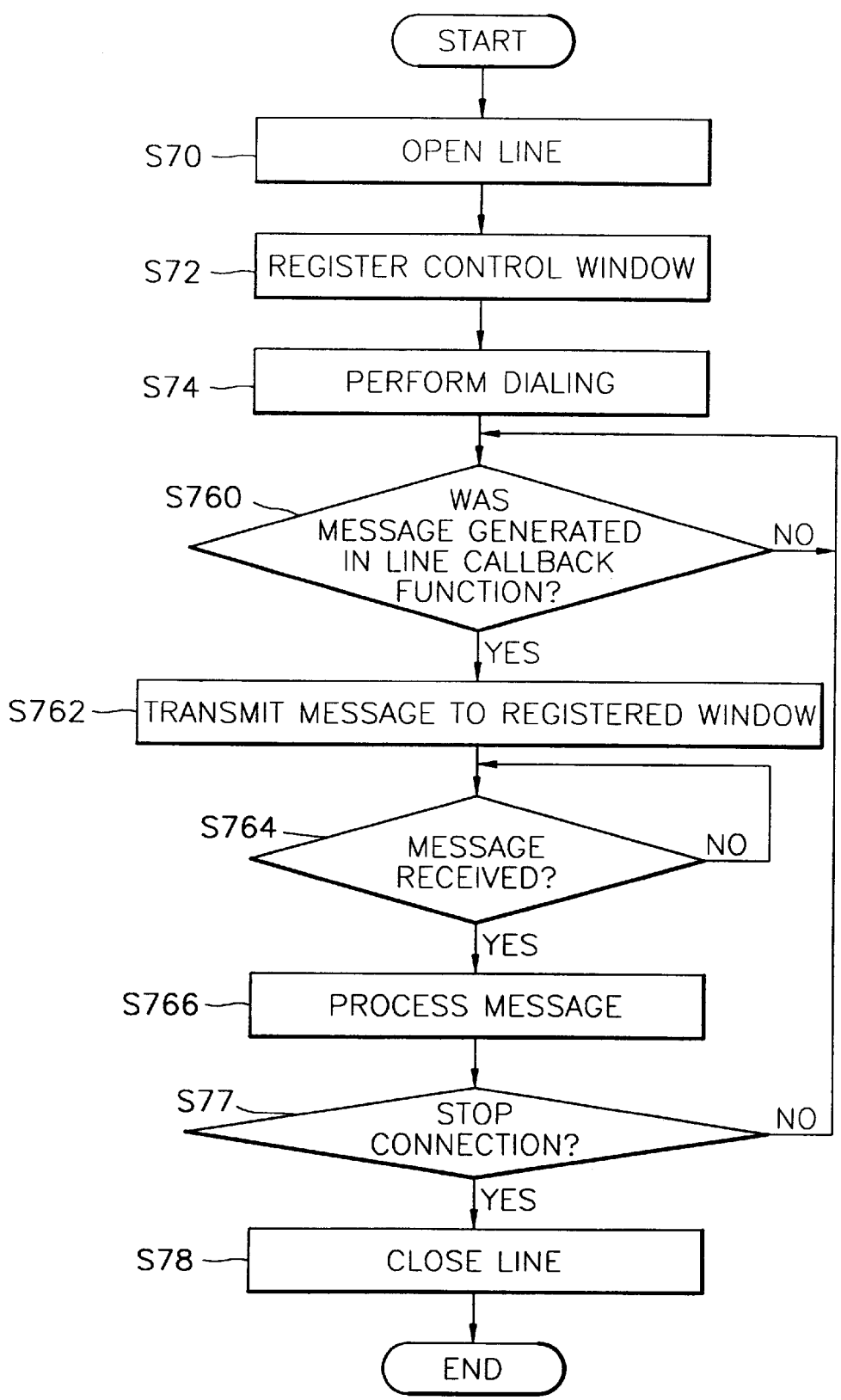
FIG. 8 is a flowchart of the a computer communications controlling process of FIG. 7 in more detail.

FIG. 8 shows a flowchart of a process for controlling the communications between a computer system and an external device illustrating the communications controlling process that describes in more detail the S76 step, shown in FIG. 7, of receiving and processing a message. The receiving and processing a message in a control window step is further divided into steps S760 through S766. In step S760, the CPU checks whether a message was generated in the line callback function. If a message is not detected then the CPU continues to check until a message is detected. Once a message is detected, the CPU transmits the message to the registered control window during step S762. In step S764 the CPU continuously checks whether the transmitted message was received in the registered control window until the CPU detects that the appropriate message was received. Then, during step S766, the function corresponding to the message received in the control window is performed.

Figure 2:
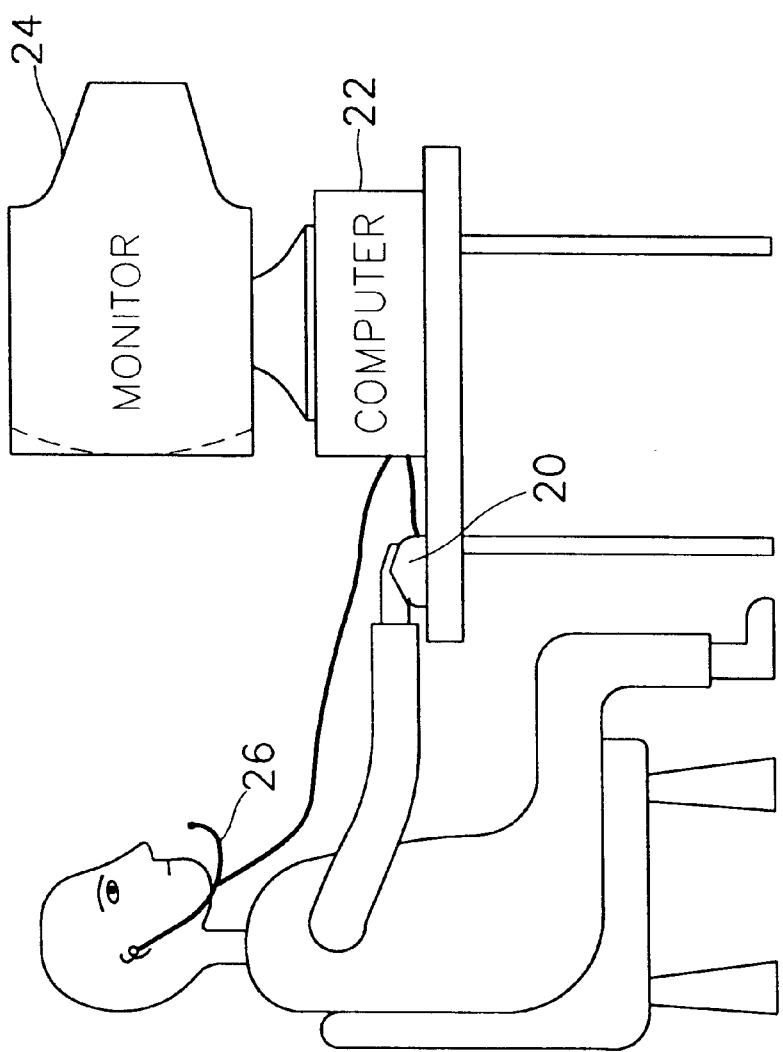
FIG. 2 is an external appearance view of a user and a computer system employing the communications process according to the principles of the present invention.

FIG. 2 shows computer system 22 operating a Windows™ type of operating system to allow the process of the present invention to communicate between the computer system and telephone 26. The user can select specific buttons or graphics displayed on the monitor screen displayed on monitor 24 using mouse 20 to input a connect or disconnect command. This allows the user to communicate with another person using earphone/microphone 26 while controlling the connection using computer 22.

Figure 3:
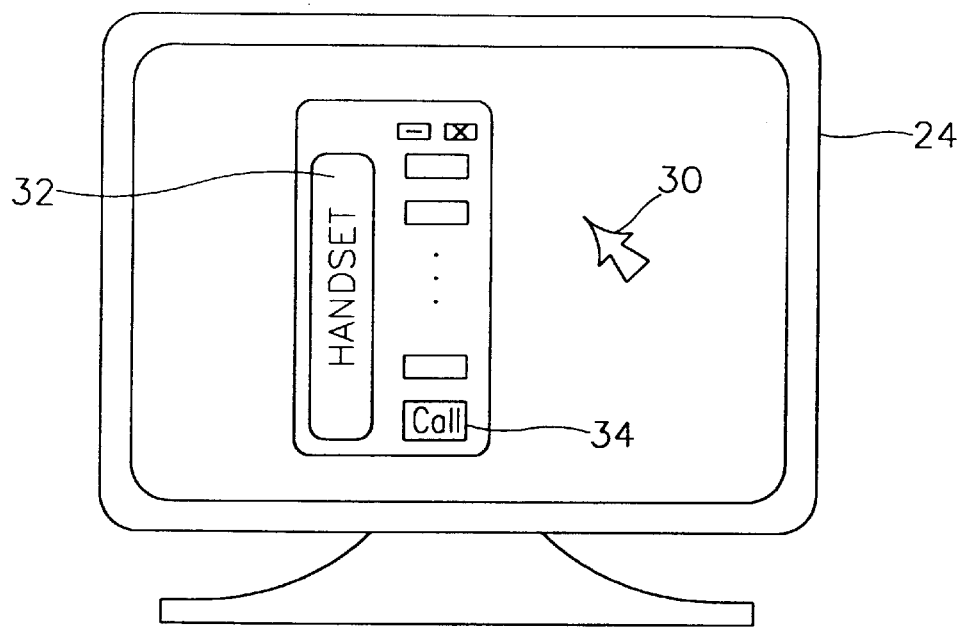
FIG. 3 shows a monitor depicting a telephone.
Figure 4:
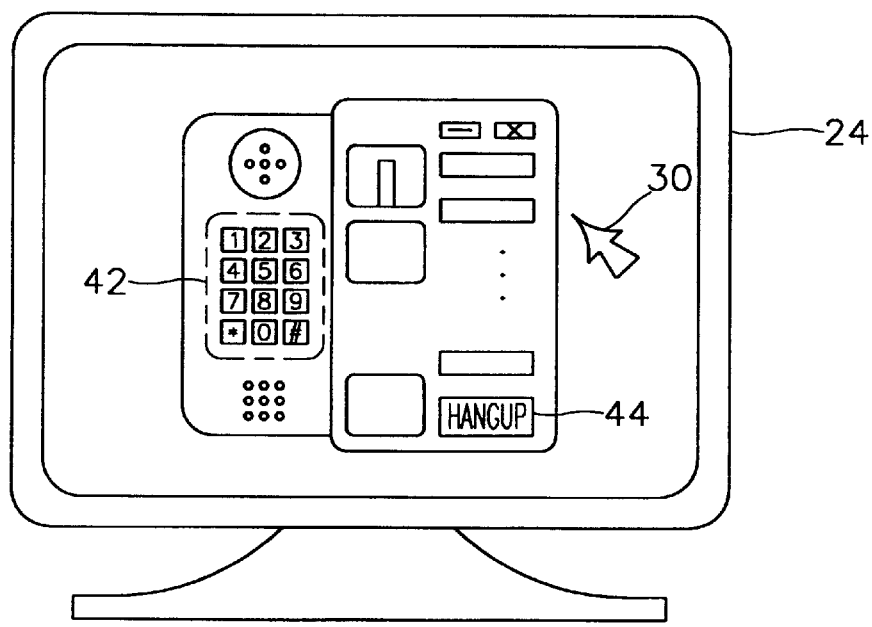
FIG. 4 shows the display of FIG. 3 after a user presses the handset graphic or the call button.

FIG. 3 illustrates the graphic that is displayed with in a registered control window when a communications process according to the present invention is used. FIG. 4 shows a second screen that is displayed when a user selects either the handset graphic or the call button on the graphic shown in FIG. 3.

A process for controlling computer communications using a control window according to another embodiment of the present invention will be described below with reference to FIGS. 2, 3 and 4. When a user inputs a command to run the process software, a monitor displays a control window containing handset graphic 32 and call button 34, as shown in FIG. 3. When the user selects handset graphic 32 or call button 34 using cursor 30, another screen is displayed within the registered control window. As shown in FIG. 4, the second screen shows a graphic of a telephone and touch tone key pad 42. Also displayed is terminate connection button 44, which will cause the phone to hang up. Thus, when a user selects various telephone buttons on touch tone key pad 42 a phone call is made. When the user wishes to end the call, a mouse click on the disconnect button will end the call.

As described above, in the process for controlling the communications between a computer system and an external device according to the present invention, complicated programs can be avoided, programming can be easily performed, available functions will be more intuitively obvious to the user, and a convenient user interface is provided. Although this preferred embodiment of the present invention has been disclosed for illustrative purposes, those skilled in the art will appreciate that various modifications, additions and substitutions are possible, without departing from the scope and spirit of the invention as disclosed in the accompanying claims. It is also possible that other benefits or uses of the currently disclosed invention will become apparent over time.

What is claimed is:

1. In a process for controlling communications between a computer system and an external device, said process comprising the steps of:
   (1) displaying a graphical interface on a variable visual display device driven by said computer system running a Windows type of operating system, said graphical interface displayed in a control window of a communication application running on said computer system consisting of a central processing unit, a plurality of random access memory, a plurality of random operating memory, said display device, an input device, and a signal modulation device;
   (2) receiving a plurality of commands from a user via any one of said graphical interface and an input device, said commands being translated into a plurality of telephony application programming interface commands;
   (3) sending a telephony application programming interface line open command to an I/O interface to open a communication line;
   (4) registering said control window;
   (5) sending a telephony application programming interface dial command to said I/0 interface to generate dialing signals when a user enters a phone number;
   (6) checking for further said commands entered by said user into said communication application, said communication application translating said commands into said telephony application programming interface commands and sending said telephony application programming interface commands to said I/O interface to process into a plurality of code specific for said Windows type of operating system;
   (7) executing said commands via processing said code;
   (8) checking for a plurality of status codes generated in a line callback function from said I/O interface;
   (9) translating said status codes into messages and displaying said status codes in said control window of said communication application;
   (10) determining whether a terminate connection command has been entered by said user;
   (11) when said terminate command has not been entered: returning to said sixth step of checking for further said commands; and
   (12) when said terminate command has been entered: closing said usable line;
the improvement comprising: the additional steps of:
   registering said control window in said line callback function;
      (b) receiving a plurality of messages generated during communications with a modem in said line callback function; and
      (c) executing a function corresponding to said plurality of messages of step b.

2. The process of claim 1, further comprising said step of checking whether said message was displayed by said control window until said message is detected in said control window.

3. The process of claim 1, further comprised of said external device being any one of a telephone, a facsimile, and another computer system.

4. The process of claim 1, further comprising
   said graphical interface being a first image depicting a telephone having a handset and a call button, said commands enterable by said user by selecting any one of said handset and said call button using said input device;

said graphical interface changing to a second image when said user selects any one of said handset and said call button, said second image depicting said telephone having a touch tone dial pad and a disconnect button;

said commands entered via said graphical interface using an input device are translated into said telephony application programming interface commands by said communication application running on said computer system.

5. The process of claim 1, with said input device being any one of a mouse, a light-pen, a touch-sensitive screen, and a keyboard.

6. The process of claim 1, further comprised of checking for said plurality of status codes in a call back function generated by said I/O interface until said status codes are detected.

7. The process of claim 1, further comprised of said I/O interface being any one of a modem card, a fax card, and a digital signal processor card.

8. The process of claim 1, further comprised of said Windows type interface being a graphical interface using symbols and menus to allow a user to enter a plurality of instructions, said instructions are then converted into code specific for a operating system running on said computer system.

9. The process of claim 3, further comprised of said graphical interface depicting any one of said telephone, said facsimile, and another computer system.

10. A process for controlling communications between a computer system and an external device via a control window, comprising the steps of:

(1) opening a usable line using a line open command of telephony application programming interface provided by a Windows operating system;

(2) registering said control window in a line callback function of telephony application programming interface;

(3) performing dialup using a line dial command of telephony application programming interface to execute a command entered by a user;

(4) receiving a plurality of messages generated during communications with a modem in said line callback function in said control window; and (5) executing a function corresponding to said plurality of messages of step 4; and (6) closing said usable line using a line close command of telephony application programming interface when said user inputs a terminate connection command.

11. The process of claim 10, further comprised of said step of registering said control window is performed after said step of performing dialup.

12. The process of claim 10, further comprised of said step of receiving a plurality of messages generated during communications with a modem in said line call back function further comprises the steps of:

checking whether said messages were generated in said line callback function until a message has been detected;

transmitting said message to said control window;

checking whether said message was received in said control window until the display of said message has been verified; and performing a function corresponding to said message received by said control window when it is determined that said message has been received.

13. The process of claim 10, further comprising the steps of:

displaying a control window containing a handset graphic and a call button on a monitor when said user inputs an operation command;

displaying a telephone and a touch tone dial pad and a disconnect button on a monitor after a user selects said handset graphic or said call button;

making a phone call by pressing said touch tone dial pad; and disconnecting said usable line by selecting said terminate connection command.

14. The process of claim 10, further comprised of said external device being any one of a telephone, a facsimile, and another computer system.

15. The process of claim 14, further comprised of said control window capable of depicting any one of said telephone, said facsimile, and said another computer system.

16. A computer system for communicating with an external device, comprising:

a display device, a central processing unit, a plurality of random access memory, a plurality of random operating memory, a signal modulator, and an input device;

said computer system running a Windows type of operating system and using a communication application to communicate with said external device;

a graphical interface displayed in a registered control window of said communication application on said display device, said graphical interface having a first image depicting a telephone having a handset graphic and a call button, said graphical interface having a second image depicting a touch tone dial pad and a disconnect button, said first image displayed until said user selects any one of said handset graphic and said call button;

a plurality of signals translated from a plurality of commands entered via said interface into said communication application by said user using said input device;

said signals translated into a plurality of telephony application programming interface commands by said communication application and sent to an I/O interface;

a usable line opened by said signal modulator in response to a telephony application programming interface line open command;

said signal modulator generating a plurality of dialing signals in response to a telephony application programming interface dial command;

a plurality of signals representing a plurality of status codes receivable by said signal modulator, said signals translated into a message and displayed in said control window;

said telephony application programming interface commands translated into specific language for said Windows type of operating system and then executed by said computer system; and generating a telephony application programming interface close line command when a user selects a disconnect button on said graphical interface with an input device;

wherein said system further comprises:

a means for registering said control window in a telephony application program interface line callback function;

a means for receiving a plurality of messages via said signal modulator in said line callback function in said control window; and a means for executing a function corresponding to said plurality of messages received in said line callback function.

17. The computer system of claim 16, further comprised of said user capable of dialing a phone number by selecting keys on said touch tone dial pad using said input device.

18. The computer system of claim 16, further comprising:

said first image of said graphical interface being said telephone having said handset and said call button, said commands enterable by said user by selecting any one of said handset and said call button using said input device;

said graphical interface changing to a second image when said user selects any one of said handset and said call button, said second image depicting said telephone having a touch tone dial pad and a disconnect button;

said commands entered via said graphical interface using an input device are translated into said telephony application programming interface commands by said communication application running on said computer system.

19. The computer system of claim 16, further comprised of said external device being any one of a telephone, a facsimile, and another computer system.

20. The computer system of claim 16, further comprised of said I/O interface being any one of a modem card, a fax card, and a digital signal processor card.

21. The computer system of claim 16, further comprised of said Windows type interface being a graphical interface using symbols and menus to allow a user to enter a plurality of instructions, said instructions are then converted into code specific for a operating system running on said computer system.

22. The computer system of claim 19, further comprised of said control window capable of depicting any one of said telephone, said facsimile, and said another computer system.

* * * * *